United States Patent
Cassese et al.

[11] Patent Number: 5,663,875
[45] Date of Patent: Sep. 2, 1997

[54] VOLTAGE CONVERTER FOR THE DISCHARGE LAMP OF A MOTOR VEHICLE HEADLIGHT, A POWER SUPPLY CIRCUIT, AND A HEADLIGHT INCLUDING THE CIRCUIT

[75] Inventors: Bruno Cassese, Creteil; Patrick Wacheux, Villejuif; Gilles Paul, Fontenay-aux-Roses; Eric Herzberger, Gagny; Jean-Marc Nicolai, Courbevoie, all of France

[73] Assignee: Valeo Electronique, Creteil, France

[21] Appl. No.: 623,402

[22] Filed: Mar. 28, 1996

[30] Foreign Application Priority Data

Mar. 29, 1995 [FR] France ................... 95 03719

[51] Int. Cl.$^6$ .................................. H02M 7/44
[52] U.S. Cl. .................................. 363/95
[58] Field of Search .................... 363/15, 21, 55–56, 363/95–97, 131–133

[56] References Cited

U.S. PATENT DOCUMENTS 4,985,821  1/1991  Cohen ........................ 363/95

FOREIGN PATENT DOCUMENTS 0 601 874A1  6/1994  European Pat. Off. .
0 633 710A1  1/1995  European Pat. Off. .
41 34 101A1  4/1992  Germany .

OTHER PUBLICATIONS

Damaye, R. and Gagne, C., SECF Editions Radio, Paris 1986 "Alimentations electronique" [Electronic power supplies].

*Primary Examiner*—Aditya Krishnan
*Attorney, Agent, or Firm*—McCormick, Paulding & Huber

[57] ABSTRACT

A converter for powering a discharge lamp of a motor vehicle headlight, the converter comprising a primary circuit and a secondary circuit which includes two branches connected in parallel, each of which is coupled by mutual induction with the primary circuit, and two diodes connected in such a manner as to prevent either of the branches discharging into the other, the transformation ratio by mutual induction with the primary circuit of one of the two branches being greater than the transformation ratio of the other, the branch having the greater transformation ratio including a switch controlled by control electronics in such a manner as to be on whenever the voltage of the lamp is greater than a given threshold voltage, and to be off whenever said voltage becomes less than said threshold.

10 Claims, 2 Drawing Sheets

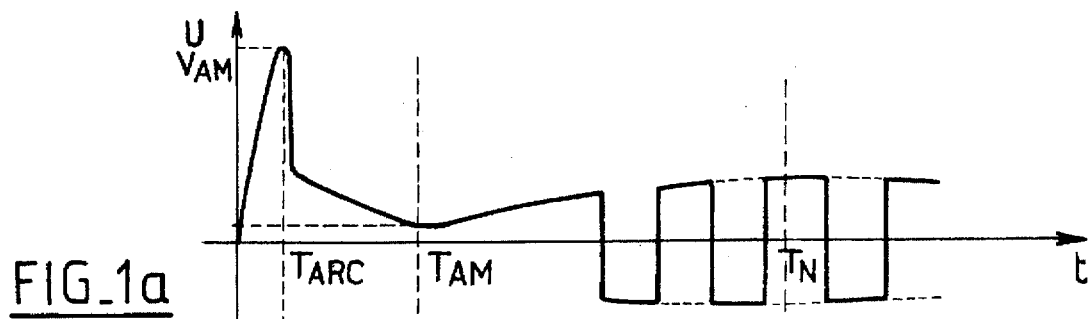
FIG_1a PRIOR ART
FIG_1b
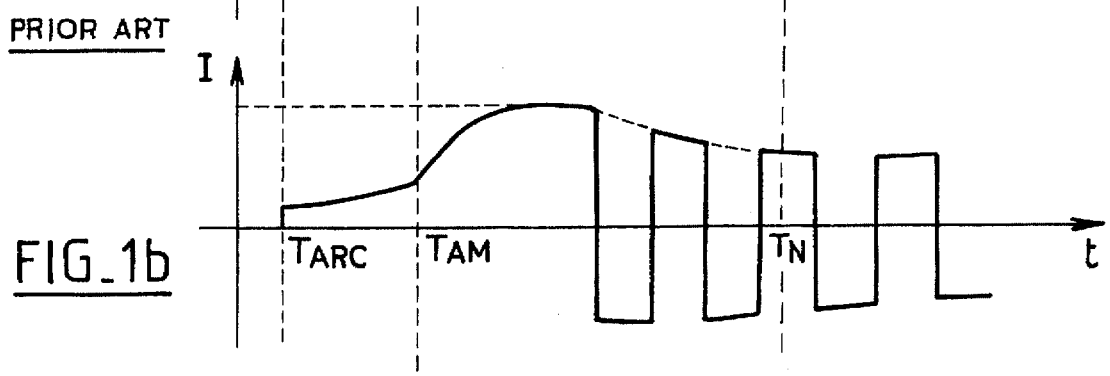
PRIOR ART
FIG_2
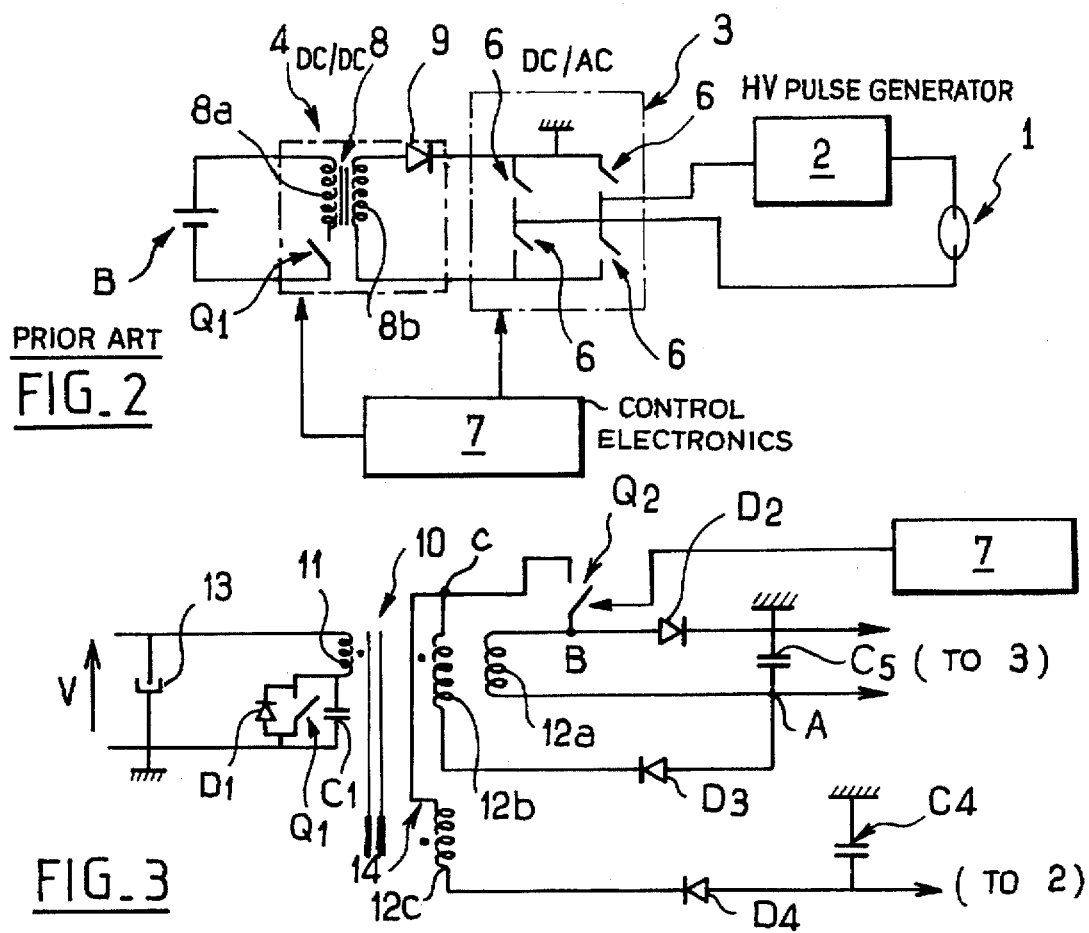
FIG_3

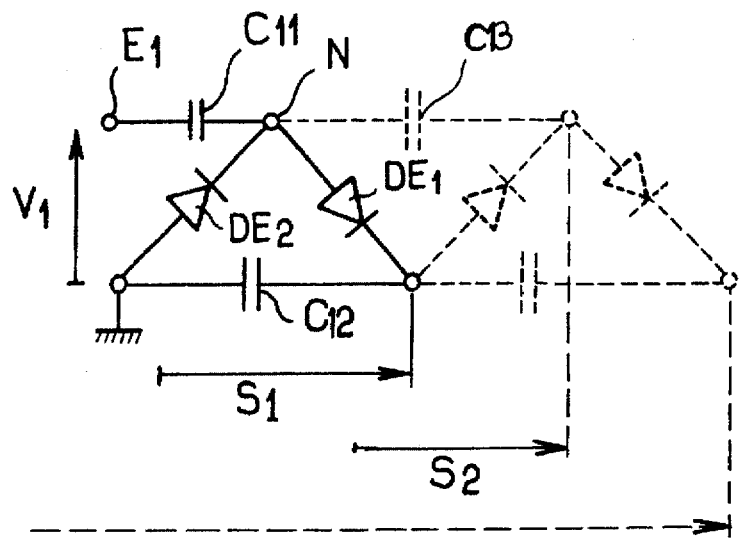
FIG_4
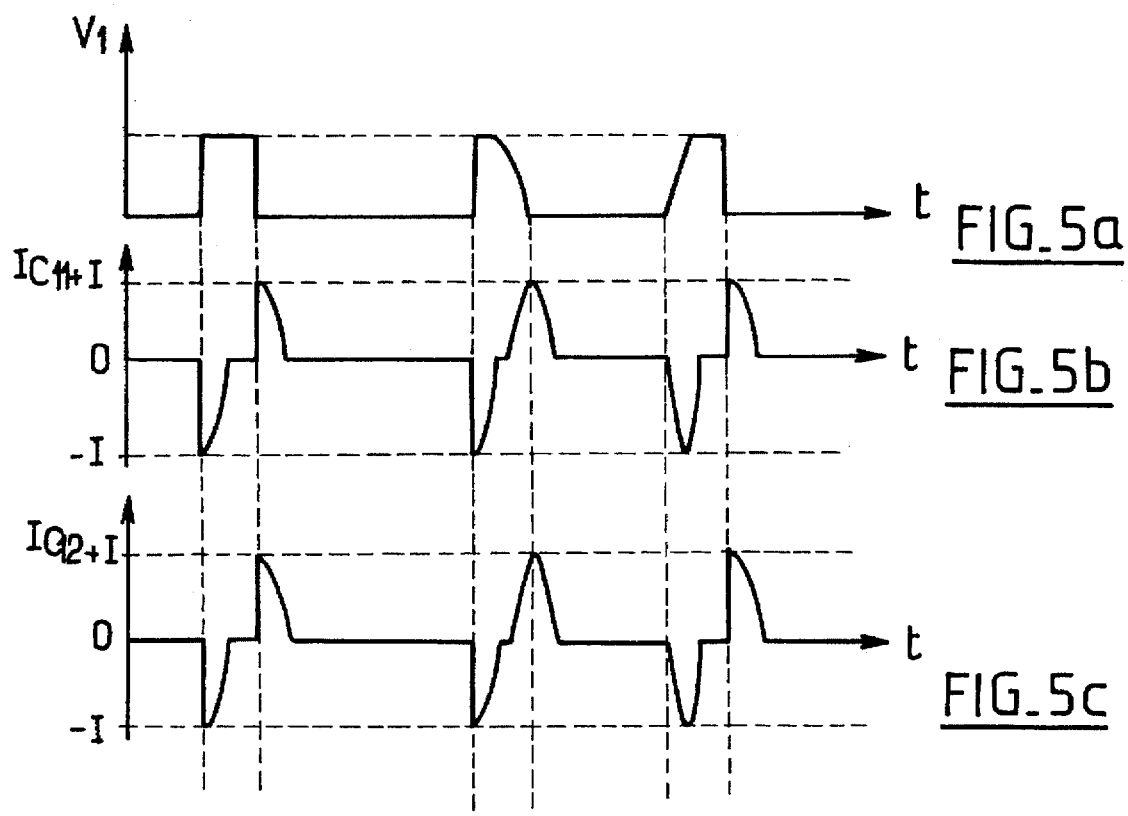
FIG_5a
FIG_5b
FIG_5c

VOLTAGE CONVERTER FOR THE DISCHARGE LAMP OF A MOTOR VEHICLE HEADLIGHT, A POWER SUPPLY CIRCUIT, AND A HEADLIGHT INCLUDING THE CIRCUIT The present invention relates to voltage converters for the discharge lamps of motor vehicle headlights, and also to power supply circuits including such converters.

The invention also relates to headlights including such converters.

BACKGROUND OF THE INVENTION

FIGS. 1a and 1b show the voltage U and the current I flowing through a motor vehicle headlight discharge lamp as a function of time t.

Under nominal conditions (starting from $T_N$), such a lamp is powered by alternating current (AC) having a square waveform at a frequency of about 200 Hz to 1 kHz depending on the lamp. Compared with direct current (DC) operation, AC operation makes it possible to increase the lifetime of the lamp considerably.

The magnitude of the current is servo-controlled so that the power delivered to the lamp is maintained at 35 W±1 W. The voltage is imposed by the lamp, and when operating under nominal conditions it varies over the range 65 V to 125 V.

When starting the lamp, a high voltage trigger pulse $V_{AM}$ is applied between its electrodes (of the order of 12 kV to 25 kV depending on the lamp). This pulse generates the arc of the lamp (time $T_{ARC}$). Thereafter, for a few hundreds of microseconds (until $T_{AM}$), the power supply of the lamp is controlled in such a manner as to ensure that the current flowing through the lamp does not drop to zero, during which time the voltage across the lamp drops back down to about 30 V to 100 V depending on the previous state of the lamp.

This trigger stage is then followed for a duration of about 10 seconds (s) to 15 s (from $T_{AM}$ to $T_N$) by a stage during which power is raised to 90 watts. The current I is then limited to 2.6 A. This stage of bringing up to power is necessary to heat up the electrodes and to evaporate off halides.

FIG. 2 is a diagram of a power supply circuit enabling such operation to take place. The discharge lamp referenced 1 is connected therein in series with a module 2 for generating the high voltage pulse, and it is fed with voltage from a DC/AC converter 3 connected downstream from a DC/DC converter 4 whose input receives the voltage (12 V) from the vehicle battery B.

The DC/AC converter 3 is an H-connected bridge of four switches 6 controlled by control electronics 7. By way of example, the four switches 6 may be MOS type transistors.

By way of example, the DC/DC converter 4 is a "monoflyback" type circuit as shown in FIG. 2. Such a circuit comprises a transformer 8 whose primary winding 8a is connected in series with a controlled switch Q1 to the terminals of the input voltage source (e.g. the vehicle battery B), while its secondary winding 8b is connected in series with a diode 9 to the terminals of the load to be powered. By way of example, the switch Q1 may be an MOS transistor whose grid is voltage-controlled by the voltage module 7.

The secondary winding 8b charges while the transistor Q1 is on. When the transistor Q1 is off, the primary winding 8a delivers the energy stored in the magnetic element to the load.

The output voltage is proportional to the input voltage multiplied by a ratio that depends on $t_{on}/t_{off}$ where $t_{on}$ and $t_{off}$ are respectively the on time and the off time of the switch Q1.

The DC/DC converter 4 generates all of the voltages other than the trigger pulse voltage. In particular, it must be capable of supplying a high voltage of 500 V for several milliseconds during startup.

The high voltages are of use only during short periods of time, during startup, but they constrain the components of the converter, and in particular its controlled switch, to be very largely dimensioned.

Unfortunately, it is presently desired to reduce the bulk of power supply circuits for discharge lamps considerably so as to enable them to be housed completely within a headlight, whereas until now the converters of the power supply circuits have been outside headlights.

OBJECTS AND SUMMARY OF THE INVENTION

An object of the invention is thus to provide a converter of a structure that enables the dimensioning of its various elements to be reduced.

To this end, the invention provides a voltage converter for powering a discharge lamp of a motor vehicle headlight, the converter comprising a primary circuit fed with a DC type voltage such as the battery voltage of the vehicle, and a secondary circuit which is coupled by mutual induction with the primary circuit and which delivers an output voltage for powering the discharge lamp, wherein its secondary circuit has two branches connected in parallel, each coupled by mutual induction with the primary circuit, and two diodes mounted so as to prevent either of the branches discharging into the other, the transformation ratio by mutual induction with the primary circuit for one of the two branches being greater than the transformation ratio for the other, the branch having the greater transformation ratio including a switch which is controlled by control electronics so as to be on so long as the lamp voltage is greater than a given threshold voltage and off when said voltage becomes less than said threshold.

BRIEF DESCRIPTION OF THE DRAWINGS

Other characteristics and advantages of the invention appear further from the following description. This description is purely illustrative and not limiting. It should be read with reference to the accompanying drawings, in which:

FIGS. 1a and 1b are described above and comprise graphs respectively showing the voltage and the current fed as a function of time to an operating discharge lamp of a motor vehicle;

FIG. 2, also described above, is a schematic for a power supply circuit of a discharge lamp;

FIG. 3 is a schematic for a converter circuit of the invention;

FIG. 4 is a schematic for additional circuitry for the circuit of FIG. 3; and

FIGS. 5a to 5c show the voltage at the input of the FIG. 4 circuit, together with the currents flowing through the two capacitors of the first stage of the circuit.

MORE DETAILED DESCRIPTION

The converter shown in FIG. 3 is included in a power supply circuit of the type shown in FIG. 2.

It includes a transformer 10 having a primary winding 11 and two parallel branches each comprising a secondary winding, the two secondary windings being referenced 12a and 12b.

The primary winding 11 is connected at one end to a source of voltage V, e.g. the vehicle battery connected in parallel with an alternator 13. At its other end, the winding 11 is connected to neutral via a capacitor C1, a diode D1, and a controlled switch Q1, connected in parallel.

The anode of diode D1 is connected to neutral, said diode D1 conducting from neutral towards the primary winding 11.

The switch Q1 is a MOS type transistor whose grid voltage is controlled by the control electronics 7 so as to regulate the power delivered to the lamp. In this case, D1 may be a diode integrated in the MOS package.

One end of the secondary winding 12a is connected to the anode of the diode D2 whose cathode is connected to neutral. The other end (point A) of the winding 12a is connected to one of a capacitor C5 whose other end is also connected to neutral.

The DC/AC converter 3 powered by the DC/DC converter of the invention as described herein is connected in parallel across the capacitor C5.

The secondary winding 12b has a greater transformation ratio than the winding 12a (the number of turns N2b in the winding 12b is greater than the number of turns N2a in the winding 12a). One end of the winding 12b is connected via a diode D3 to the end of the capacitor C5 which is not connected to neutral (point A), the diode D3 being conductive from the capacitor C5 towards the secondary winding 12b. The other end of the winding 12b is connected via a controlled switch Q2 to a node B between the diode D2 and the capacitor C5. By way of example, the switch Q2 may be an NPN bipolar transistor whose base is fed with current by the control electronics 7.

The secondary circuit also includes a third branch referenced 14 which includes an inductive winding 12c which is connected to a node C between the switch Q2 and the winding 12b. The other end of the winding 12c is connected to the cathode of a diode D4 whose anode is connected firstly to a power supply input of the module 2 for generating the trigger pulse and secondly to one end of a capacitor C4 whose other end is connected to neutral.

This third branch 14 is inductively coupled to winding 11 and powers the high voltage module for generating the trigger pulse of the discharge lamp. The voltage required by this module for triggering pulses is 800 V.

The converter structure described above operates as follows.

When the discharge lamp is switched on, the control electronics 7 switches on switch Q2.

Since the number N2b of turns in the secondary winding 12b is greater than the number N2a of turns in the secondary winding 12a, the diode D2 is not conductive and the capacitor C5 charges to +500 V.

It is thus the secondary winding 12b which provides feed current during the trigger stage for the lamp 1.

Simultaneously, the winding 12c generates a higher voltage for feeding the module 2 that generates the high voltage pulse.

When the lamp voltage drops below a predetermined threshold (of about 150 V), the control electronics 7 turns off switch Q2. This threshold corresponds to a voltage that is greater than the lamp voltage after triggering (i.e. greater than the nominal operating range of 68 V to 125 V). It is then the winding 12a which feeds current to the lamp.

When the switch Q2 is off, the module 2 is also out of circuit.

As will already have been understood, such a structure makes it possible to reduce the maximum voltage to which the primary elements of the converter, and in particular the switch Q1, are subjected. For example, the numbers of turns N2a and N2b may be chosen so that the switch Q1 can be dimensioned solely to withstand voltages of the order of 100 V or less, for example Q1 could be a 60 V MOS transistor of a kind that is standard in the car industry.

In addition, this structure has the advantage of making it possible to obtain very good power efficiency over a very wide range of voltages.

According to another advantageous aspect of the invention, it is possible to simplify the transformer 10 by providing the branch 14 which feeds the high voltage module 2 with a voltage multiplier circuit of the Schenkel type, as shown in FIG. 4.

Schenkel type circuits are conventional in power supply electronics. In this respect, reference may advantageously be made to the work entitled "Alimentations électroniques" [Electronic power supplies] by R. Damaye and C. Gagne, published by SECF Editions Radio, Paris 1986.

Such a circuit comprises one or more stages each constituted by a capacitor C11 connected between an input E1 to which a voltage V1 is applied and a node N that is connected firstly to the cathode of a diode DE1 and secondly to the anode of a diode DE2. The cathode of the diode DE2 is connected to neutral. A capacitor C12 is connected between neutral and the anode of the diode DE1.

FIGS. 5a to 5c show the voltage V1 at the input of the voltage multiplier circuit, together with the currents IC1 and IC2 flowing through each of the two capacitors C11 and C12.

The voltage S1 across the terminals of capacitor C12 is equal to twice the peak voltage of the starting pulse V1: the capacitor C12 charges on the rising front of the starting pulse through diode DE1, and also on the falling front by C11 discharging through diode DE2.

Naturally, by adding further stages, it is possible to obtain greater multiplication ratios. In FIG. 4, the voltage S2 across the terminals of capacitor C13 of the following stage is three times V1.

Thus, it is possible using a single stage to generate the voltage required (1,000 V) by the module 2 for generating the high voltage pulse.

As will already have been understood, the invention also relates to headlights having discharge lamps whose power supply circuits include converters of the type described above. Such a headlight conventionally includes a reflector with the discharge lamp(s) being disposed in the base thereof.

Converters of the invention make it possible to reduce the bulk of such a headlight.

In particular, for a headlight having a standard housing in which the reflector is received, the converter is advantageously disposed inside said housing, possibly together with the entire power supply circuit.

We claim:

1. A voltage converter comprising a primary circuit fed with a DC voltage such as the battery voltage of a vehicle, and a secondary circuit which is coupled by mutual induction with the primary circuit and which delivers an output voltage for powering a vehicle headlight discharge lamp, wherein its secondary circuit has two branches connected in parallel which deliver between their common ends an output voltage for powering a discharge lamp of a motor vehicle headlight, each of said branches being coupled by mutual induction with the primary circuit, said secondary circuit having two diodes mounted so as to prevent either of the branches discharging into the other, the transformation ratio by mutual induction with the primary circuit for one of the two branches being greater than the transformation ratio for the other, the branch having the greater transformation ratio including a switch which is controlled by control electronics so as to be on so long as the lamp voltage is greater than a given threshold voltage and off when said voltage becomes less than said threshold.

2. A converter according to claim 1, including a third branch connected to a node of the higher transformation ratio branch, said third branch feeding the high voltage module for generating the trigger pulse of the discharge lamp.

3. A converter according to claim 2, wherein the third branch includes an inductive element in series with a diode, capacitor means being connected between the output node of said third branch and neutral.

4. A converter according to claim 1, wherein the third branch includes a voltage multiplier circuit which comprises one or more stages each constituted by a capacitor connected between an input to which a voltage is applied and a node that is first connected to the cathode of a first diode and secondly to the anode of a second diode, the cathode of the second diode being connected to neutral, a capacitor being connected between neutral and the anode of the first diode.

5. A converter according to claim 1, wherein capacitor means are connected in parallel with the two branches that are coupled by mutual induction with the primary circuit.

6. A converter according to claim 1, wherein the primary circuit includes a switch controlled by control electronics so as to regulate the power supplied to the lamp.

7. A converter according to claim 1, wherein the branch having the higher transformation ratio is suitable for delivering an output voltage of about 500 V, with the threshold voltage being about 150 V.

8. A power supply circuit for a motor vehicle headlight discharge lamp, comprising a DC/DC converter according to claim 1, together with a DC/AC converter interposed between the DC/DC converter and the discharge lamp.

9. A motor vehicle headlight comprising a reflector, at least one discharge lamp disposed in the base of said reflector, and a circuit for powering the discharge lamp, wherein said circuit includes a converter according to claim 1.

10. A headlight according to claim 9, including a housing in which the reflector is received, wherein the converter is disposed inside the housing.

* * * * *